United States Patent
Eickhoff et al.

(10) Patent No.: US 11,397,117 B2
(45) Date of Patent: Jul. 26, 2022

(54) DOOR CLOSER DIAGNOSTICS SYSTEM

(71) Applicant: Schlage Lock Company LLC, Carmel, IN (US)

(72) Inventors: Brian C. Eickhoff, Danville, IN (US); Joseph W. Baumgarte, Carmel, IN (US); Christopher Eubel, Dayton, OH (US); Jonathan Coyle, Dublin, OH (US)

(73) Assignee: Schlage Lock Company LLC, Carmel, IN (US)

( * ) Notice: Subject to any disclaimer, the term of this patent is extended or adjusted under 35 U.S.C. 154(b) by 25 days.

(21) Appl. No.: 16/822,600

(22) Filed: Mar. 18, 2020

(65) Prior Publication Data

US 2021/0293637 A1 Sep. 23, 2021
US 2022/0065719 A9 Mar. 3, 2022

Related U.S. Application Data

(60) Provisional application No. 62/821,011, filed on Mar. 20, 2019.

(51) Int. Cl.
*G01L 5/00* (2006.01)
*E05F 1/10* (2006.01)

(52) U.S. Cl.
CPC .............. *G01L 5/00* (2013.01); *E05F 1/10* (2013.01); *E05Y 2900/132* (2013.01)

(58) Field of Classification Search
CPC ....... G01L 5/00; G07C 9/00309; E05F 1/002; E05F 1/10; E05F 1/105; E05F 3/102;

(Continued)

(56) References Cited

U.S. PATENT DOCUMENTS 5,525,880 A 6/1996 Arthur et al.
6,729,071 B1 * 5/2004 Kawanobe ............ E05F 15/646
49/360

(Continued)

FOREIGN PATENT DOCUMENTS

WO 2008/134442 11/2008
WO 2011/130638 10/2011

(Continued)

OTHER PUBLICATIONS

International Search Report; International Searching Authority; International Application No. PCT/US2020/023868; dated Jun. 26, 2020; 4 pages.

(Continued)

*Primary Examiner* — Stephen R Burgdorf
(74) *Attorney, Agent, or Firm* — Taft Stettinius & Hollister LLP

(57) ABSTRACT

A method and apparatus relating to generating, by at least one motion sensor of a data acquisition device that is mounted to a door having a door closer, motion data indicative of motion as the door is moved from an open position to a closed position, generating, by at least one load cell of the data acquisition device, load data as the door is being opened, analyzing the motion data and load data by a central processing device, determining at least one adjustment to the door closer based on at least one of a duration the door was in each of a plurality of door movement zones, as determined using the motion data, and a force applied to open the door, as determined using the load data, and displaying at least one installation instruction corresponding with the at least one adjustment on a graphical user interface of the central processing device.

24 Claims, 11 Drawing Sheets

(58) Field of Classification Search
CPC ..... E05F 3/12; E05F 3/22; E05F 15/40; E05F 15/41; E05F 15/63; E05F 15/70; E05F 15/73; E05F 15/77; E05Y 2201/492; E05Y 2400/66; E05Y 2400/80; E05Y 2600/10; E05Y 2900/132
USPC ......................................................... 340/665
See application file for complete search history.

(56) References Cited

U.S. PATENT DOCUMENTS

| | | | | |
|---|---|---|---|---|
| 7,034,486 | B1* | 4/2006 | McMahon | H02H 7/0851 |
| | | | | 318/283 |
| 7,999,690 | B1* | 8/2011 | Shilts | E05D 11/00 |
| | | | | 340/666 |
| 8,415,902 | B2 | 4/2013 | Burris et al. | |
| 8,564,235 | B2 | 10/2013 | Burris et al. | |
| 8,773,237 | B2 | 7/2014 | Burris et al. | |
| 8,779,713 | B2 | 7/2014 | Burris et al. | |
| 2001/0030689 | A1* | 10/2001 | Spinelli | E05F 15/73 |
| | | | | 348/155 |
| 2008/0106397 | A1 | 5/2008 | Van Esch | |
| 2010/0115853 | A1* | 5/2010 | Gebhart | H02P 6/085 |
| | | | | 49/506 |
| 2011/0252597 | A1 | 10/2011 | Burris et al. | |
| 2014/0353049 | A1* | 12/2014 | Vidal | G16H 70/40 |
| | | | | 177/25.13 |
| 2015/0075879 | A1* | 3/2015 | Sakai | G01G 21/00 |
| | | | | 177/1 |
| 2015/0262438 | A1 | 9/2015 | Zasowski et al. | |
| 2016/0024831 | A1 | 1/2016 | Houser et al. | |
| 2016/0348415 | A1 | 12/2016 | Baumgarte | |
| 2017/0198496 | A1 | 7/2017 | Beck | |
| 2017/0328108 | A1* | 11/2017 | Long | G01L 3/242 |
| 2019/0078368 | A1 | 3/2019 | Langenberg et al. | |
| 2019/0162705 | A1* | 5/2019 | Langenberg | G01C 19/5776 |
| 2020/0300026 | A1* | 9/2020 | Lawhon | G05B 19/0426 |
| 2021/0047873 | A1* | 2/2021 | Cate | G07C 9/00896 |
| 2021/0079704 | A1* | 3/2021 | Lawhon | E05F 7/00 |

FOREIGN PATENT DOCUMENTS

| | | |
|---|---|---|
| WO | 2016/196583 | 12/2016 |
| WO | 2017/100273 | 6/2017 |

OTHER PUBLICATIONS

Written Opinion of the International Searching Authority, International Searching Authority; International Application No. PCT/US2020/023868; dated Jun. 26, 2020; 7 pages.

* cited by examiner

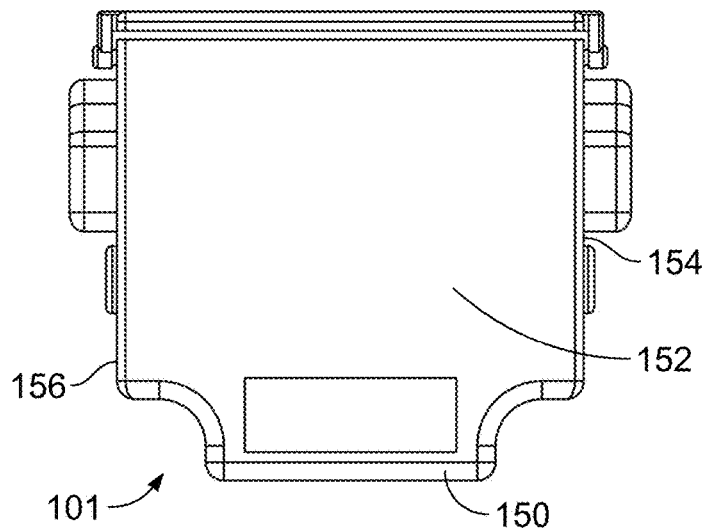
FIG. 1B
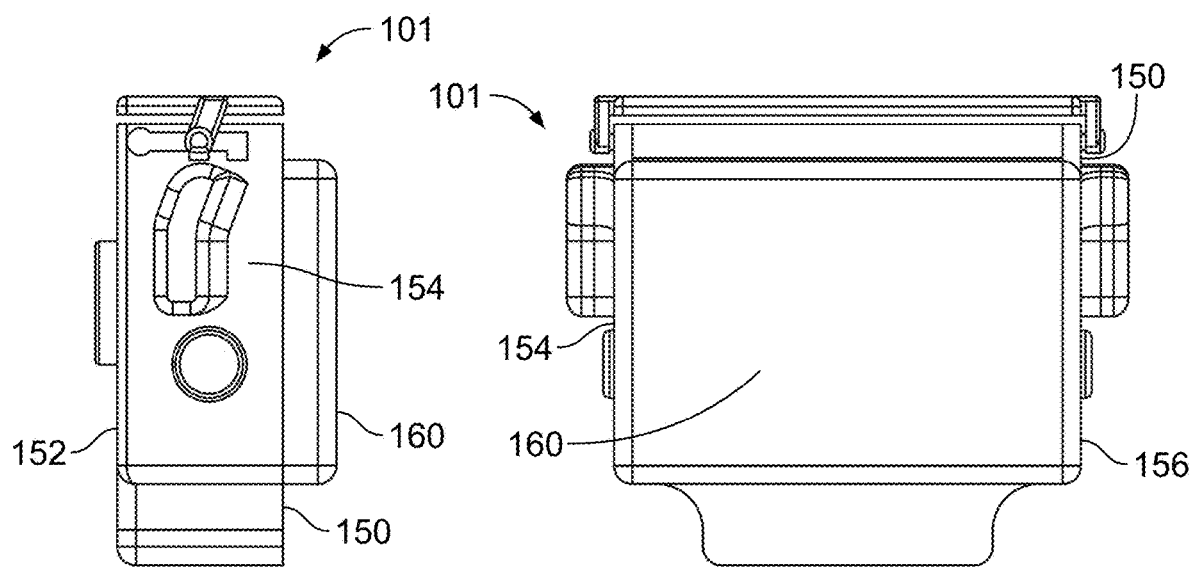
FIG. 1C
FIG. 1D

DOOR CLOSER DIAGNOSTICS SYSTEM

CROSS REFERENCE TO RELATED APPLICATIONS

This present application claims the benefit of U.S. Provisional Patent Application No. 62/821,011 filed Mar. 20, 2019.

BACKGROUND

Installation of hydraulic door closers is typically a manual process that can result in a sub-optimal setup. In general, door closers are adjusted to ensure the door closes as desired and the operation complies with any relevant requirements (e.g., American Disabilities Act (ADA) requirements, building management or architect requirements, etc.). However, proper adjustment of a door closer can be a daunting task, particularly for untrained installers. The door closer may include multiple adjustment points that have similar behaviors (e.g., increasing/decreasing the speed of the door), as well as a variety of different mounting positions for the closer, which can complicate making the proper adjustments. Further, a contractor will oftentimes install the door closer and, if the door opens and shuts, move on to the next job. In such cases, adjustment of the door closer is typically left for a maintenance person, who may rely on trial and error (e.g., through many iterations of adjustment) and/or years of experience to fine-tune the operation of the door closer. However, a maintenance person often relies on that person's own subjective determination as to whether the door closer has been properly adjusted, and is typically without the ability to verify that the door closer has been adjusted to operate in a manner that complies with the relevant requirements, such as, for example ADA requirements. Thus, even after adjustment, the door closer operation may still be sub-optimal.

SUMMARY

According to one aspect, a method may include generating, by at least one sensor of a data acquisition device, motion data indicative of motion of a door having a door closer as the door is moved between an open position and a closed position, transmitting the motion data from the data acquisition device to a central processing device, analyzing the motion data to determine a duration the door was in each of a plurality of door movement zones between the open position and the closed position, determining at least one adjustment to the door closer for a successful installation of the door closer based on the duration the door was in each of the plurality of door movement zones, and displaying at least one installation instruction corresponding with the at least one adjustment on a graphical user interface of a central processing device.

In some embodiments, the data acquisition device is coupled to the door. In some embodiments, analyzing the motion data may include transmitting the motion data from the central processing device to a server, analyzing the motion data by the server to determine the duration the door was in each of the plurality of door movement zones, and determining the at least one adjustment to the door closer may include determining the at least one adjustment by the server.

In some embodiments, the method may further include displaying, on the graphical user interface of the central processing device, a notification indicative of a successful installation of the door closer in response to a determination that no adjustments to the door closer are necessary for a successful installation of the door closer. In some embodiments, determining the at least one adjustment may include determining an adjustment to a main valve of the door closer, determining an adjustment to a latch valve of the door closer, and/or determining an adjustment to a spring of the door closer.

In some embodiments, the plurality of door movement zones may include a main zone and a latch zone, determining the at least one adjustment to the door closer may include determining to loosen a main valve of the door closer in response to determining the duration the door was in the main zone is greater than a first threshold time, and determining the at least one adjustment to the door closer may include determining to tighten the main valve in response to determining the duration the door was in the main zone is less than a second threshold time, wherein the first threshold time is greater than the second threshold time. Further, in some embodiments, determining the at least one adjustment to the door closer may include determining to loosen a latch valve of the door closer in response to determining the duration the door was in the latch zone is greater than a third threshold time, and determining the at least one adjustment to the door closer may include determining to tighten the latch valve in response to determining the duration the door was in the latch zone is less than a fourth threshold time, wherein each of the third threshold time and the fourth threshold time is based on the duration the door was in the main zone. Further, each of the third threshold time and the fourth threshold time may be proportional to the duration the door was in the main zone.

In some embodiments, determining the at least one adjustment to the door closer may include determining to at least one of loosen the main valve or tighten a spring of the door closer in response to determining the door does not move from the open position to the closed position in less than a fifth threshold time, wherein the fifth threshold time is greater than the first threshold time. In some embodiments, determining the at least one adjustment to the door closer may include determining the at least one adjustment to the door closer based on at least one user-selected installation setting for the door closer.

According to another aspect, a door closer diagnostics system may include a door closer secured to a door, a data processing device, and a central processing device. The central processing device may include a display, while the data acquisition device can include at least one motion sensor and at least one load cell and be configured to be mounted to the door, and may be configured to generate, by the at least one motion sensor, motion data indicative of motion of the door as the door is moved between an open position and a closed position, generate, by the at least one load cell, load data indicative of a force used to open the door from the closed position, and transmit the motion data and the load data to the central processing device. The central processing device can be configured to analyze the motion data to determine a duration the door was in each of a plurality of door movement zones between the open position and the closed position, determine at least one adjustment to the door closer based on the duration the door was in each of the plurality of door movement zones, and transmit at least one installation instruction corresponding with the at least one adjustment to the central processing device. The central processing device can be configured to analyze the load data to (i) determine the force used to open the door, (ii) determine if the force used to open the door satisfies a predetermined criteria, (iii) determine, if the force used to open the door did not satisfy the predetermined criteria, at least one force adjustment to the door closer for adjusting the force required to open the door, and (iv) transmit at least a second installation instruction corresponding with the at least one force adjustment to the central processing device. The central processing device can be further configured to display the at least one installation instruction on a graphical user interface of the central processing device.

In some embodiments, the at least one motion sensor comprises a gyrometer, and the at least one load cell comprises a load cell or a load transducer. In some embodiments, the data acquisition device includes a mount structured to mount the data acquisition device to at least one of the door closer or the door, including, for example, via a direct attachment of the data acquisition device to the door. In some embodiments, the door closer may include a main valve, a latch valve, and a spring adjustment screw, and the at least one adjustment may include an adjustment to at least one of the main valve, the latch valve, or the spring adjustment screw.

According to yet another embodiment, a method may include mounting a data acquisition device to a door having a door closer, launching an application on a central processing device to record (1) motion data indicative of motion of the door generated by at least one sensor of the data acquisition device, and (2) load data indicative of a inputted mechanical force applied to open the door generated by at least one load cell of the data acquisition device, opening the door to an open position, releasing the door from the open position, and adjusting the door closer based on at least one installation instruction provided by the application in response to an analysis of at least one of (1) the motion data generated as the door moved from the open position to a closed position, and (2) the load data generated as the door was being opened.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 1B, 1C, and 1D illustrate front, side, and back views, respectively, of an exemplary embodiment of a data acquisition device.

DETAILED DESCRIPTION

Figure 1A:
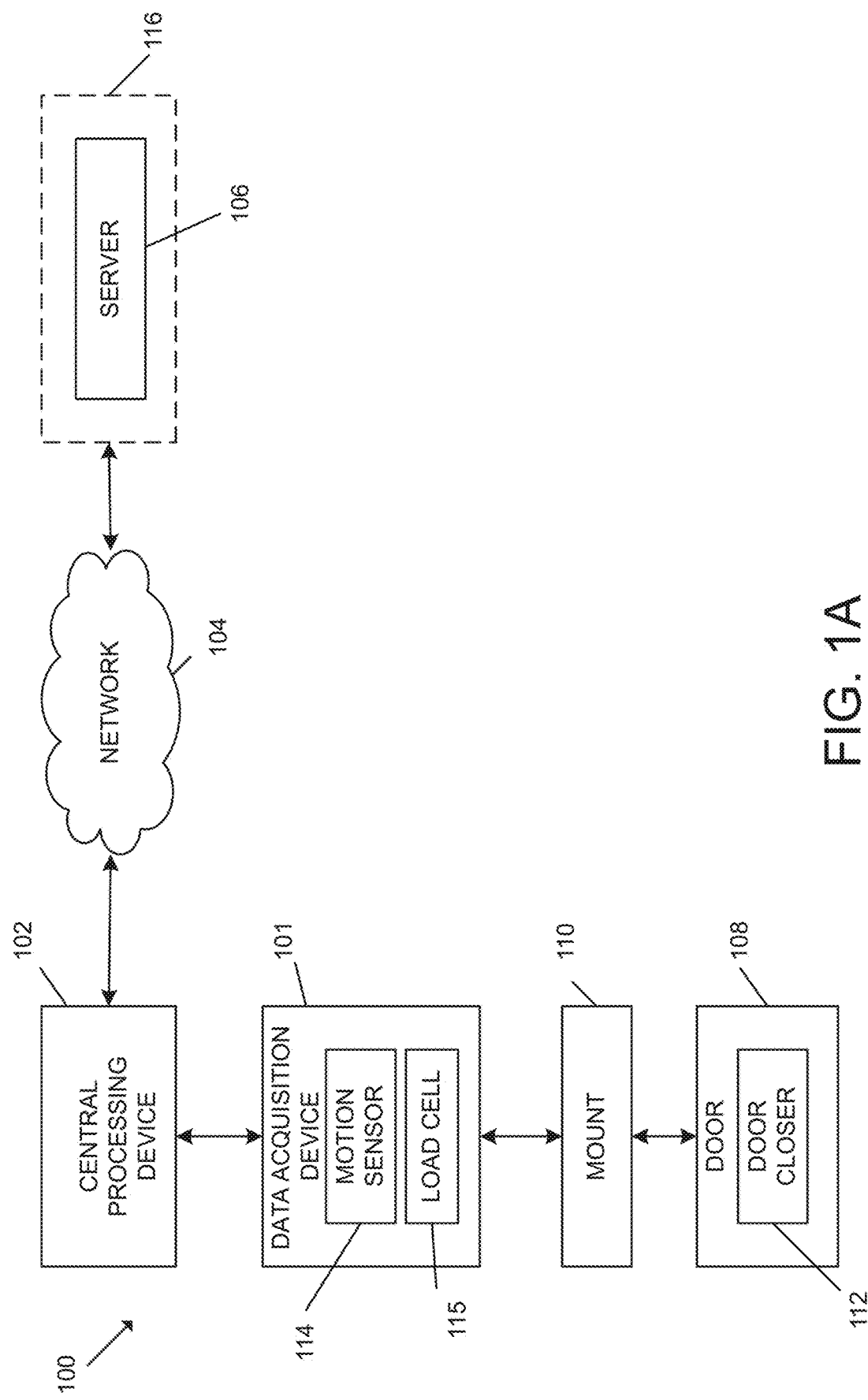
FIG. 1A is a simplified block diagram of at least one embodiment of a door closer diagnostics system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1A, in the illustrative embodiment, a door closer 112 diagnostics system 100 includes a data acquisition device 101, a central processing device 102, a network 104, a server 106, a door 108, and a mount 110. In the illustrative embodiment, the data acquisition device 101 can be secured to the door 108, a door closer 112 that is mounted to the door 108 and/or a component thereof (e.g., a lock or exit device), with the mount 110. Alternatively, according to certain embodiments, the data acquisition device 101 can be held by the service technician against the door 108, the door closer 112, or another component secured to the door 108 without the use of a mount 110.

According to certain embodiments, the mount 110 can be coupled or secured directly to the data acquisition device 101 such that the mount 110 and data acquisition device 101 form a single, unitary component, or, alternatively, is a separate component that is selectively separable from the data acquisition device 101. For example, according to certain embodiments, the mount 110 can be coupled or secured to the data acquisition device 101, such as, for example, via an adhesive, a mechanical fastener(s), and/or a mechanical connection, including, but not limited to, a screw(s), hook and loop material, or snap fit, among others. For example, according to certain embodiments, the mount 110 is a tape that, on one side, is attached to the data acquisition device 101, and which, on an opposing side, provides a re-useable adhesive that is selectively securable to, and well as detachable from, the door 108 and/or components therefore. Further, according to such an embodiment, the re-useable adhesive surface of the mount 110 can be configured to allow the mount 110 to be used for attachment to a door 108 and/or related components in a plurality of door closer installations. Alternatively, according to other embodiments, the mount 110 can be a separate component that is configured for selective, and removable, engagement with the data acquisition device 101, such that he mount 110 provides, for example, a holder, bracket, or support for securing the data acquisition device 101. Additionally, as discussed below, when the data acquisition device 101 is mounted to the door 108 or related components, movement of the data acquisition device 101 is indicative of movement of the door 108.

As described in detail below, in the illustrative embodiment, one or more sensors of the data acquisition device 101 generate motion data, which is indicative of motion of the door 108 as the door 108 moves between open and closed positions, including movement of the door 108 as the door 108 closes from the open position to the closed position. For example, as shown in FIG. 1A, the illustrative data acquisition device 101 includes a motion sensor 114, such as, for example, a gyrometer. At least according to embodiments in which the motion sensor 114 is a gyrometer, the motion sensor 114 can be configured to measure the angular velocity of the data acquisition device 101 and, therefore, the angular velocity of the door 108, during its movement. The load cell or load transducer 115 is used to measure the door opening force, and, moreover, measures the inputted mechanical force needed to open the door 108, or door opening force. However, the data acquisition device 101 can have a variety of additional sensors in addition to, or, alternatively, in lieu of, the one or more of the motion sensor 114 and the load transducer 115, including, for example, a potentiometer that can be used in connection with determining the door opening force, an accelerometer or magnetometer, and/or connect sensors, including, for example, potentiometers or encoders, that can be connected to a hinge(s) of the door 108 and/or a door closer 112.

The data acquisition device 101 is also configured to transmit, as an electrical signal, the motion data derived from use of the motion sensor 114 and the input force data derived by the load cell or load transducer 115 to the central processing device 102. A variety of different types of devices can be utilized as the central processing device 102 and/or the server 106, such as, for example, a mobile device, including, but not limited to, a desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

Additionally, the data acquisition device 101 and the central processing device 102 can be configured to utilize one or more communication technologies (e.g., wireless or wired communications) and associated protocols (e.g., Ethernet, Bluetooth®, Wi-Fi®, WiMAX, etc.) at least in connection with the central processing device 102 receiving the signals transmitted by the data acquisition device 101. Accordingly, the data acquisition device 101 and the central processing device 102 may include hardware, software, and/or firmware suitable for performing the techniques described herein.

The central processing device 102 can be configured to analyze the motion data and input force data, among other data, received by the central processing device 102 from the data acquisition device 101 to determine whether the door closer 112 has been successfully installed (e.g., properly adjusted). For example, with respect to use of motion data transmitted from the data acquisition device 101 to the central processing device 102, the central processing device 102 can be configured to determine whether the door closer 112 has been successfully installed (e.g., properly adjusted) based on the duration the door 108 was in each door movement zone/region between the open position and the closed position. In particular, in some embodiments, the approximate door angle may be determined based on the angular velocity data (e.g., by integrating the angular velocity of the door 108), and the duration the door 108 was in each region/zone of the door closing may be determined, for example, based on the internal time and sampling rate of the angular velocity.

Further, with respect to input force data, the load cell or load transducer 115 can be used to detect information indicative to the amount of mechanical force needed to open the door 108. The type of data provided by the load cell or load transducer 115 can vary based on the type of load cell or load transducer 115 implemented. For example, according to certain embodiments, changes in electrical resistance can be correlated to loads placed on the load cell or load transducer 115, which can be translated to a load placed on the door 108. Further, according to certain embodiments, the load cell or load transducer 115 can include a retractable measuring device that can measure spring force at particular distances from door hinges for various door sizes, including, for example, 34 inch, 38 inch, 48 inch, 54 inch, and 60 inch doors, among other door 108 sizes. Based on information provided by the data acquisition device 101 from the load cell or load transducer 115 to the central processing device 102, the central processing device 102 can be configured to determine an amount of mechanical force needed to open the door 108. Based on this determined amount of mechanical force, the central processing device 102 and/or server 106, can determine whether the door closer 112 needs to be adjusted, such as, for example, adjusted in order to comply with relevant requirements, such as, for example ADA requirements.

If not successfully installed, the central processing device 102 or server 106 can determine one or more adjustments to the door closer 112 based on the door movement zone durations and transmit installation instructions and/or the determined mechanical force needed to open the door 108. Such adjustments can be communicated to an individual, such as, for example, an installer or maintenance personal, in variety of different manners, including, for example, via use of the central processing device 102. More specifically, according to certain embodiments, such adjustments can be communicated via a display on a graphical user interface of the central processing device 102. In particular, in the illustrative embodiment, the graphical user interface can display an image of the door closer 112 and specifically identify the component(s) of the door closer 112 to adjust and/or an amount of the adjustment. It should be appreciated that, by providing specific and objective installation instructions, the number of steps/iterations required to achieve a proper installation may be significantly reduced.

In the illustrative embodiment, the central processing device 102 can communicate with the server 106 over any suitable network 104. The network 104 may be embodied as any type of communication network or connection(s) capable of facilitating communication between the central processing device 102 and remote devices (e.g., the server 106). As such, the network 104 may include one or more networks, routers, switches, computers, and/or other intervening devices. For example, the network 104 may be embodied as or otherwise include one or more cellular networks, telecommunication networks, local or wide area networks, publicly available global networks (e.g., the Internet), ad hoc networks, short-range communication links, or a combination thereof. Additionally, such communications can also facilitate communications via the server 102 and/or the central processing device 102 to other devices, such as, for example, an automatic or technician initiated communication of a record to a device of a building owner, tenant, or supervisor indicating a successful, and correctly completed, installation/adjustment of the door closer 112.

In some embodiments, the server 106 may be embodied as a cloud-based device or collection of devices within a cloud environment 116. In such embodiments, it should be appreciated that the server 106 may be embodied as a "serverless" or server-ambiguous computing solution, for example, that executes a plurality of instructions on-demand, contains logic to execute instructions only when prompted by a particular activity/trigger, and does not consume computing resources when not in use. That is, the server 106 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the server 106 described herein. For example, when an event occurs, the application may contact the virtual computing environment (e.g., via an HTTPS request to an API of the virtual computing environment), whereby the API may route the request to the correct virtual function (e.g., a particular server-ambiguous computing resource) based on a set of rules.

It should be appreciated that each of the data acquisition device 101, the central processing device 102, and the server 106 may be embodied as a computing device similar to the computing device 200 described below in reference to FIG. 2. For example, in the illustrative embodiment, one more, if not each, of the data acquisition device 101, the central processing device 102 and the server 106 can include a processing device 202 and a memory 206 having stored thereon operating logic 208 for execution by the processing device 202 for operation of the corresponding device.

The door closer 112 can be embodied as any door closer suitable for the performance of the functions described herein. In some embodiments, the door closer 112 can be embodied as an auto-operator or auto-equalizer device. Although the adjustments to the door closer 112 are described herein primarily in reference to a main valve, a latch valve, and a spring, it should be appreciated that other door closers 112 may include additional and/or alternative adjustment mechanisms that may be adjusted based on the techniques described herein. In various embodiments, the door closer 112 may include, for example, one or more backcheck position regulating valves, backcheck selector, advanced variable backcheck, latch speed regulating valves, sweep speed regulating valves, delayed action closing regulating valves, staked valves, hydraulic adjustment valves, captured valves, and/or spring power adjustment mechanisms. Further, in some embodiments, the adjustment mechanisms may include electrical or electromechanical settings/mechanisms and/or software/firmware settings related to forces associated with the door closing.

Figure 13:
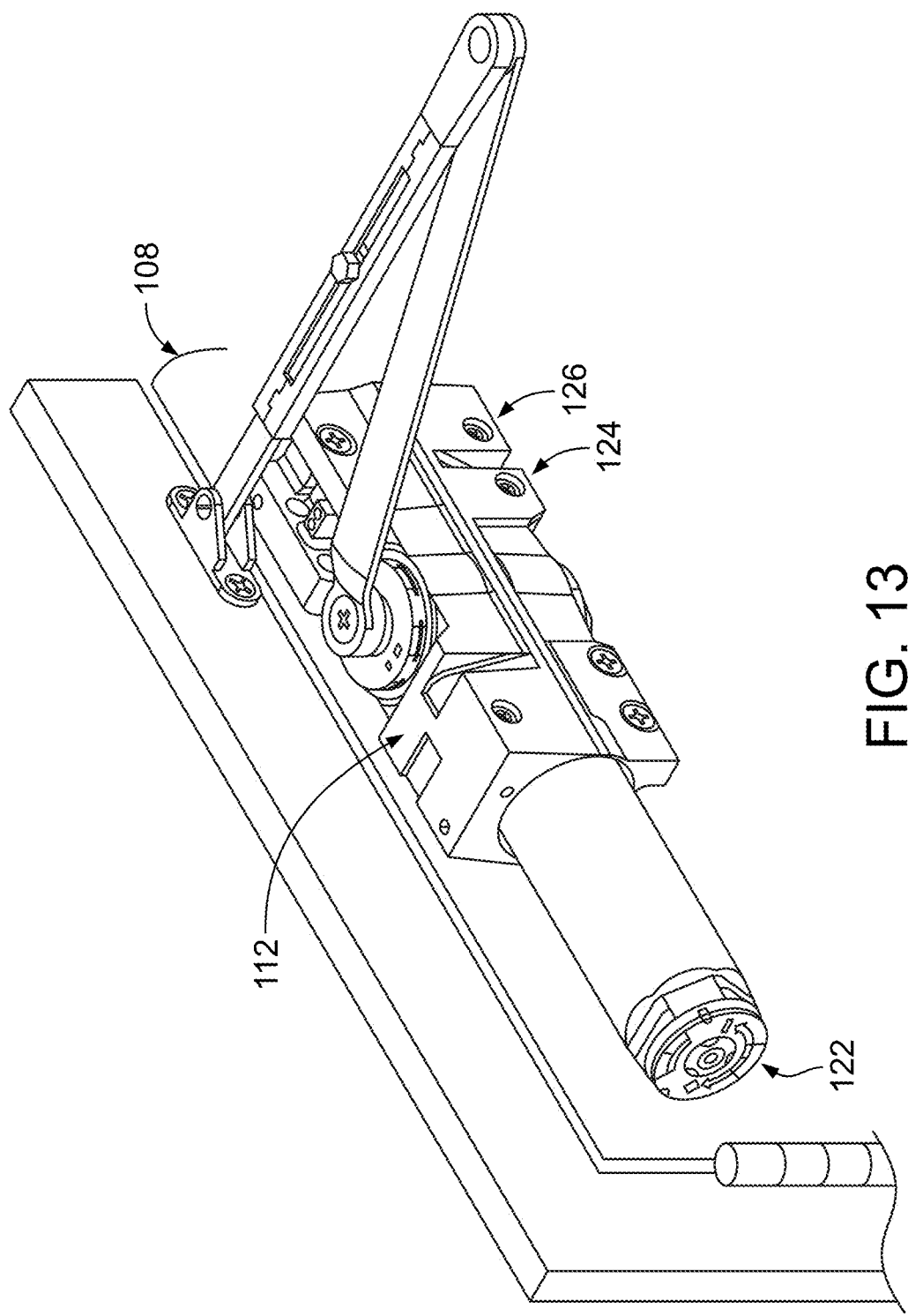
FIG. 13 is a perspective illustration of a door closer that may be utilized in connection with certain embodiments.

An example of a door closer 112 that can be utilized in connection with certain embodiments of the present application is illustrated in FIG. 13. According to the illustrated embodiment, the door closer 112 includes a spring adjustment screw 122 operable to tighten and loosen the internal spring of the closer 112 to adjust the closing force provided by the spring. The door closer 112 can also include a main valve 124, which can modulate the flow of hydraulic fluid through a passage to reduce the movement speed of the door 108 in the main swing zone. The door closer 112 can also include a latch valve 126, which can modulate the flow of hydraulic fluid through a passage to reduce the movement speed of the door 108 in the latch zone. Accordingly, the closing speed of the door 108 in each of the main zone and the latch zone, and thus the amount of time that the door spends in each of the main zone and the latch zone, as well as the force needed to open the door 108, can be adjusted by adjusting the spring adjustment screw 122, the main valve 124, and/or the latch valve 126. While FIG. 13 provides an exemplary door closer 112, for at least purposes of the subject disclosure, the door closer 112 can be a variety of other types of devices that can be utilized in controlling movement of a door 108 between open and closed positions, including, but not limited to, adjustable spring hinges with dampening functionality, among other devices.

Although only one data acquisition device 101, one central processing device 102, one network 104, and one server 106 are shown in the illustrative embodiment of FIG. 1A, the door closer diagnostics system 100 may include multiple data acquisition devices 101, central processing devices 102, networks 104, and/or servers 106 in other embodiments. Further, in some embodiments, the central processing device 102 can be configured to perform one or more of the functions of the server 106. Accordingly, in such embodiments, the network 104 and the server 106 may be omitted from the door closer diagnostics system 100. Further, although the motion data (e.g., the gyrometer) and inputted mechanical force data can be generated by one or more motion sensors 114 and one or more load cells or load transducers 115 of the data acquisition device 101 in the illustrative embodiment, it should be appreciated that the motion and/or inputted mechanical force data can be generated by sensors of another component/device secured to the door 108 in other embodiments (e.g., the door closer 112, a lock device, an exit device, an embedded device, an access control device, and/or another device/component). In such embodiments, the motion and/or inputted mechanical force data can be transmitted to the data acquisition device 101, the central processing device 102, and/or to the server 106 for further analysis (e.g., via a gateway device).

Additionally, the data acquisition device 101 can include an accelerometer, pushbutton, door position sensor, pushbar-actuated or lever-actuated system, and/or another suitable mechanism to wake the data acquisition device 101 to determine whether to begin recording, for example, with the motion sensor 114 and/or load cell or load transducer 115. In some embodiments, the data acquisition device 101 may be awaken by a transmission from the central processing device 102 in response to user input via the application to begin recording the motion data. In some embodiments, one or more additional sensor(s) may be permanently installed on the door 108, or a component thereof, and the motion and/or inputted mechanical force data and/or required/recommended adjustments can be transmitted to the server 106, which may be analyzed remotely to determine, for example, whether to notify a service technician (e.g., automatically via email).

FIGS. 1B, 1C, and 1D illustrate front, side, and back views, respectively, of an exemplary embodiment of a data acquisition device 101. As shown, the data acquisition device 101 can include an outer housing 150 having a front wall 152 and an opposing rear wall 154, as well as opposing sidewalls 156, 158. The outer housing 150 can define an interior space in which components or hardware of the data acquisition device 101 can be positioned, including, but not limited to, one or more motion sensors 114 and one or more load cells or load transducers 115, among other sensors or hardware. As shown in the exemplary embodiment shown in FIG. 1D, the mount 110 can be secured or otherwise coupled to the rear wall 154 of the outer housing 152. While a variety of mechanisms or components can be used for the mount 110, as previously discussed, according to certain embodiments the mount 110 is a tape or adhesive having a re-useable adhesive surface 160 facing outwardly from the data acquisition device 101 such that the re-useable adhesive surface 160 can be placed against an outer surface of the door 108.

Figure 2:
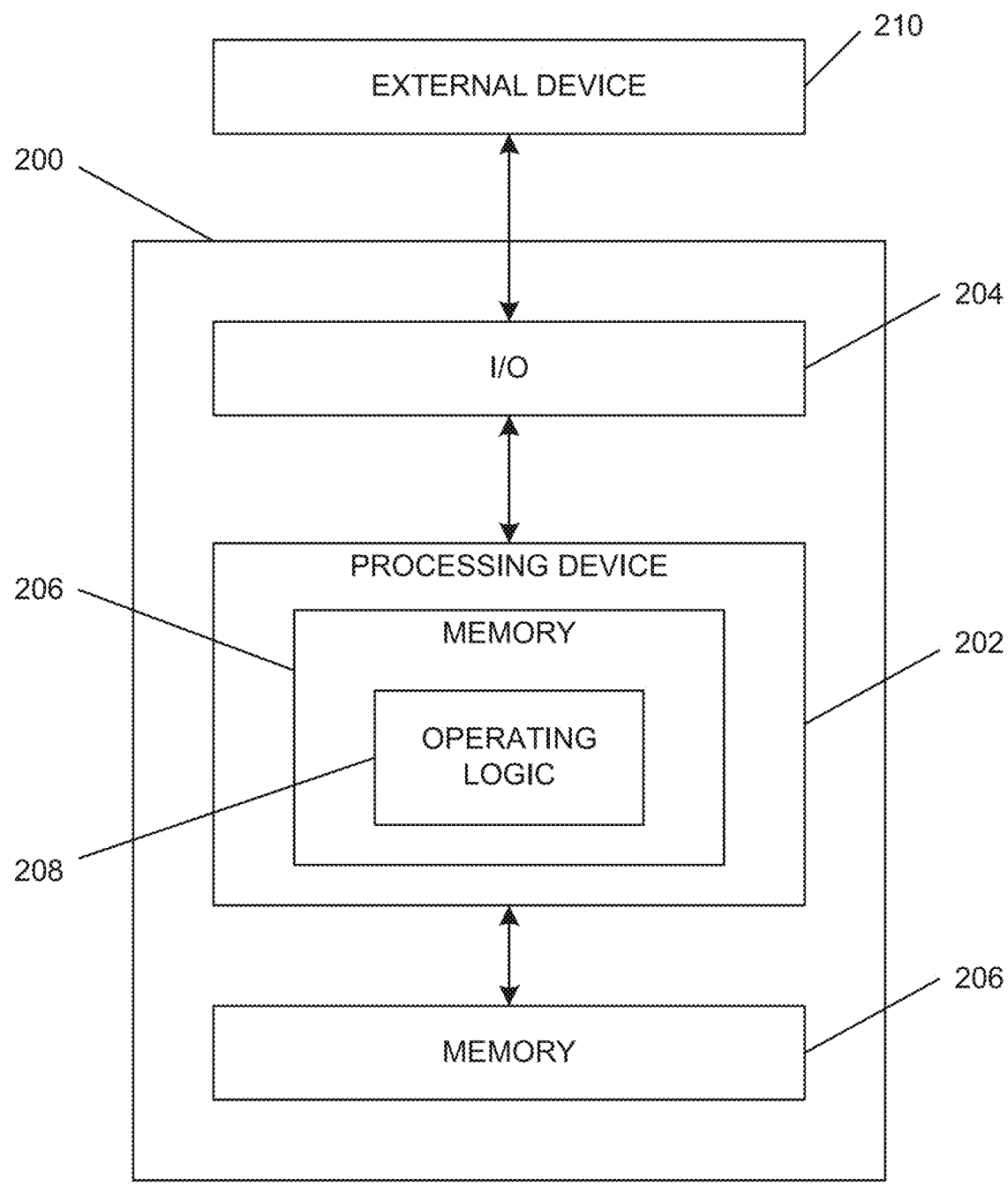
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of the data acquisition device 101, central processing device 102, and/or server 106 that can be utilized in connection with the diagnostics system 100 illustrated in FIG. 1A. The computing device 200 can include one or more, if not all, of the following: a processing device 202 that executes algorithms and/or processes data in accordance with operating logic 208, an input/output device 204 that enables communication between the computing device 200 and one or more external devices 210, and memory 206 that stores, for example, data received from internal components of the device 200, and/or from the external device 210 via the input/output device 204.

The input/output device 204 allows the computing device 200 to communicate with the external device 210. For example, the input/output device 204 can include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 can be embodied as the central processing device 102 and/or the server 106, while the computing device 200 can be the data acquisition device 101. Further, in some embodiments, the external device 210 can be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 can be integrated into the computing device 200.

The processing device 202 can be embodied as any type of processor(s) capable of performing the functions described herein. In particular, the processing device 202 can be embodied as one or more single or multi-core processors, microcontrollers, or other processor or processing/controlling circuits. For example, in some embodiments, the processing device 202 can include or be embodied as an arithmetic logic unit (ALU), central processing unit (CPU), digital signal processor (DSP), and/or another suitable processor(s). The processing device 202 can be a programmable type, a dedicated hardwired state machine, or a combination thereof. Processing devices 202 with multiple processing units can utilize distributed, pipelined, and/or parallel processing in various embodiments. Further, the processing device 202 can be dedicated to the performance of just the operations described herein, or can be utilized in one or more additional applications. In the illustrative embodiment, the processing device 202 is programmable and executes algorithms and/or processes data in accordance with operating logic 208 as defined by programming instructions (such as software or firmware) stored in the memory 206. Additionally, or alternatively, the operating logic 208 for processing device 202 may be at least partially defined by hardwired logic or other hardware. Further, the processing device 202 can include one or more components of any type suitable to process the signals received from the input/output device 204, or from other components or devices, and to provide desired output signals. Such components can include digital circuitry, analog circuitry, or a combination thereof.

The memory 206 can be of one or more types of non-transitory computer-readable media, such as a solid-state memory, electromagnetic memory, optical memory, or a combination thereof. Furthermore, the memory 206 can be volatile and/or nonvolatile and, in some embodiments, some or all of the memory 206 can be of a portable type, such as a disk, tape, memory stick, cartridge, and/or other suitable portable memory. In operation, the memory 206 can store various data and software used during operation of the computing device 200, such as operating systems, applications, programs, libraries, and drivers. It should be appreciated that the memory 206 can store data that is manipulated by the operating logic 208 of the processing device 202, such as, for example, data representative of signals received from and/or sent to the input/output device 204, in addition to or in lieu of storing programming instructions defining operating logic 208. As shown in FIG. 2, the memory 206 can be included with the processing device 202 and/or coupled to the processing device 202 depending on the particular embodiment. For example, in some embodiments, the processing device 202, the memory 206, and/or other components of the computing device 200 can form a portion of a system-on-a-chip (SoC) and be incorporated on a single integrated circuit chip.

In some embodiments, various components of the computing device 200 (e.g., the processing device 202 and the memory 206) can be communicatively coupled via an input/output subsystem, which can be embodied as circuitry and/or components to facilitate input/output operations with the processing device 202, the memory 206, and other components of the computing device 200. For example, the input/output subsystem can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 can, according to certain embodiments, include other or additional components, such as those commonly found in a typical computing device (e.g., various input/output devices and/or other components). It should be further appreciated that one or more of the components of the computing device 200 described herein can be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 can be in communication with the computing device 200.

Figure 3:
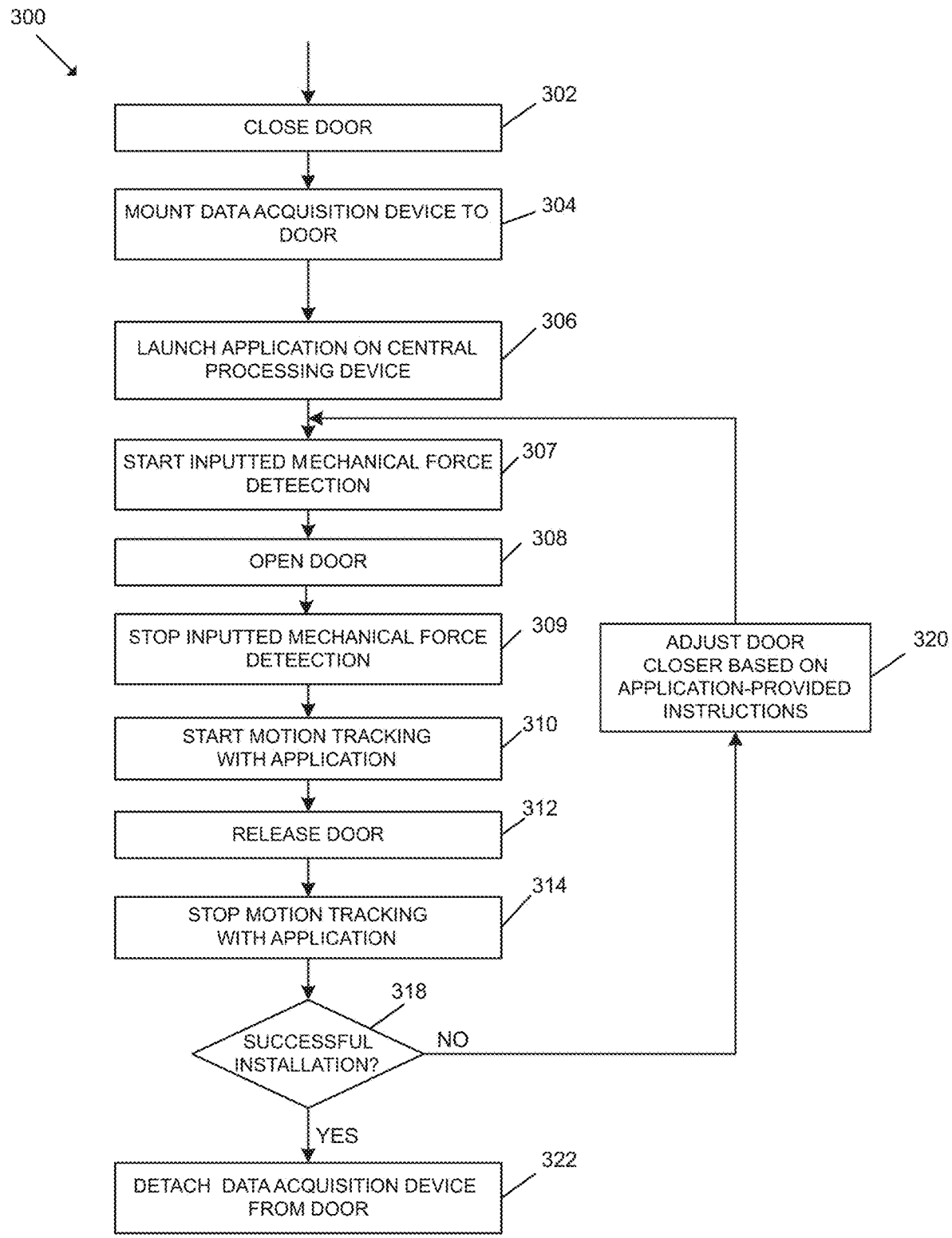
FIG. 3 is a simplified flow diagram of at least one embodiment of a method for installing a door closer using the door closer diagnostics system of FIG. 1A.
Figure 7:
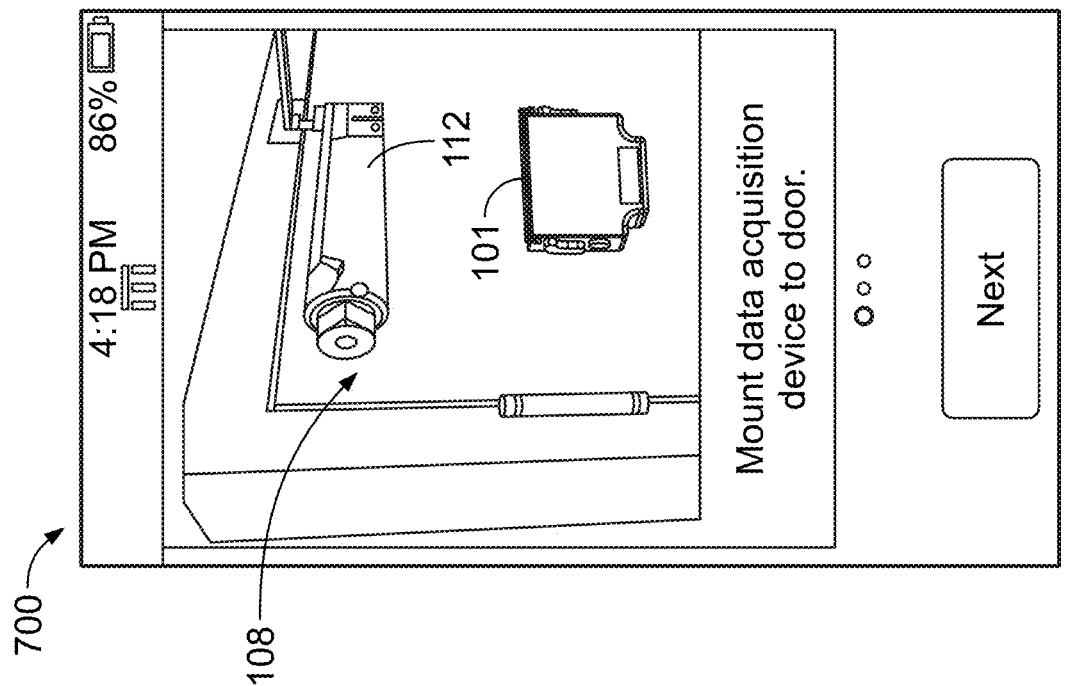

Referring now to FIG. 3, a service technician can execute a method 300 for installing a door closer 112 using the door closer diagnostics system 100. As described herein, the service technician can rely on an application executing on the central processing device 102 to provide the technician with step-by-step instructions for installing and adjusting the door closer 112. It should be appreciated that the particular blocks of the method 300 are illustrated by way of example, and such blocks may be combined or divided, added or removed, and/or reordered in whole or in part depending on the particular embodiment, unless stated to the contrary. The illustrative method 300 begins with block 302 in which the service technician closes the door 108. In block 304, the technician mounts the data acquisition device 101 to the door 108. As described above, the data acquisition device 101 can be mounted to the door 108, to the door closer 112, or to another component or device secured to the door 108 depending on the particular embodiment. In block 306, the technician launches the application on the central processing device 102. Although the application is described herein as being launched after the data acquisition device 101 has been secured to the door 108, it should be appreciated that the application may be launched before securing the data acquisition device 101 to the door 108 in other embodiments. For example, in some embodiments, the application may instruct the technician to mount the data acquisition device 101 to the door 108, as depicted in the exemplary screen capture 700 of the graphical user interface from the central processing device 102 shown in FIG. 7.

In block 307, the technician provides user input to the application via the graphical user interface to start detection of the inputted mechanical force (e.g., generating/recording the information detected, or otherwise measured, by the load cell load transducer 115). Additionally, according to certain embodiments, such user input can also relate to proving information relating to the particular door closer 112 that is being installed and/or adjusted, as well as information relating to the associated application or environment of use. For example, in block 307, the user input to the application can include information that identifies the door closer 112 that is being installed/adjusted, the associated mounting configuration, and/or a profile for the door 108 or associated application, among other information.

For example, according to certain embodiments, the technician can input either manually or from a captured visual image(s), or, alternatively, select from a pre-defined list, via the graphical user interface of the application on the central processing device 102, an identifier for the door closer 112, such as, for example, a model number, serial number, and/or model name, among other identifiers that can be used to identify the door closer 112 being installed/adjusted. Such an identification of the door closer 112 can assist with identifying the associated installation instructions, instructions relating to adjustable features of the door closer 112, and/or settings for the door closer 112. For example, information identifying the door closer 112, such as, for example, information obtained from a visual image of a QR code, via user entry, or by user selection while using the graphical user interface of the application on the central processing device 102 can be communicated to the server 106. From such information, the server 106 can retrieve the corresponding instructions or other information that corresponds to the identified door closer 112, including, for example, instructions that can be used in block 424, as discussed below.

Further, according to certain embodiments, in block 422, the user input can also relate to identifying the type of mounting configuration for the door closer 112. For example, the graphical user interface of the application on the central processing device 102 can provide the technician with the ability to identify from a predetermined listing whether the mounting configuration for the door closer 112 is a parallel arm, track arm, or top jamb mount, among other types of mounting configurations. Such information can be used, for example by the server 106 to retrieve the corresponding instructions and/or settings for the door closer 112 that can be associated with the particular identified mounting configuration. Additionally, as with other user inputted information, such information regarding the mounting configuration can be combined at least with other user inputted information, such as, for example, information used to identify the particular model of door closer 112 being installed/adjusted, to allow for information to be retrieved, such as, for example, by the server 106, that can provide an more specific indication of the settings of the door closer 112 that are to be attained for the installation/adjustment to be deemed successful.

Additionally, as previously mentioned, the user input to the application via the graphical user interface can also include, according to certain embodiments, a plurality of door profiles, which can, for example, correspond to the associated application or environment of use in which the door 108, and thus the associated door closer 112, will operate. For example, a profile can include one or "ADA Opening" profiles, which, for example, can be settings associated with the door closer 112 being set to comply with certain ADA requirements, including ADA requirements limiting the force needed to open a closer door 108. Additionally, one or more of the profiles can relate to the whether the door 108 on which the door closer 112 is being used is an exterior front door or a stairwell door, among other door locations. Such identification of the associated application or environment of use can the settings that the door closer 112 is to attain if an installation/adjustment is to be considered successful. For example, a door closer 112 associated with an exterior front door profile may, compared to other door profiles, be set to provide a higher closing so as to be able to overcome stack pressures, while a stairwell door profile may have settings associated with attaining a relatively higher backcheck force that can minimize the potential of the door 108 swinging into someone walking down an adjacent hallway. Further, according to certain embodiments, such profiles can be predetermined, such as, for example, provided by or otherwise based on information attained from the manufacturer of the door closer 112. Additionally, or alternatively, such profiles can be user created, such as, for example, created and saved by the technician and/or saved modified or customized versions of the above-mentioned predetermined profiles.

In block 308, the technician opens the door 108. In particular, in the illustrative embodiment, the door 108 can be opened to ninety degrees (or approximately ninety degrees) from the closed position. In other embodiments, it should be appreciated that the door 108 can be opened to another threshold distance suitable for ascertaining sufficient motion data for performing the functions described herein. In block 309, the technician can provide user input to the application via the graphical user interface to cease detection of the inputted mechanical force (e.g., when the door 108 comes to the open position). Alternatively, such stoppage in the detection of the inputted mechanical force, if any stoppage, can occur automatically, such as, for example, upon a reduction in detected inputted mechanical force, after a certain predetermined time duration, and/or upon detection of another event, such as, for example, a stoppage in the movement associated with opening of the door 108 and/or detection of the door 108 moving in a different direction, such as, for example, toward a closed position. According to other embodiments, the application can determine which data received by the central processing device 102 from the data acquisition device 101 corresponds to the use of inputted mechanical force to open the door 108, and which data does not correspond to inputted mechanical force to open the door 108. Such a determination can be based, at least in part, on the data received by the central processing device 102 from the data acquisition device 101 reaching, or falling below, a threshold value so as to indicate a decrease and/or stoppage in the inputted mechanical force associated with opening the door 108.

Figure 8:
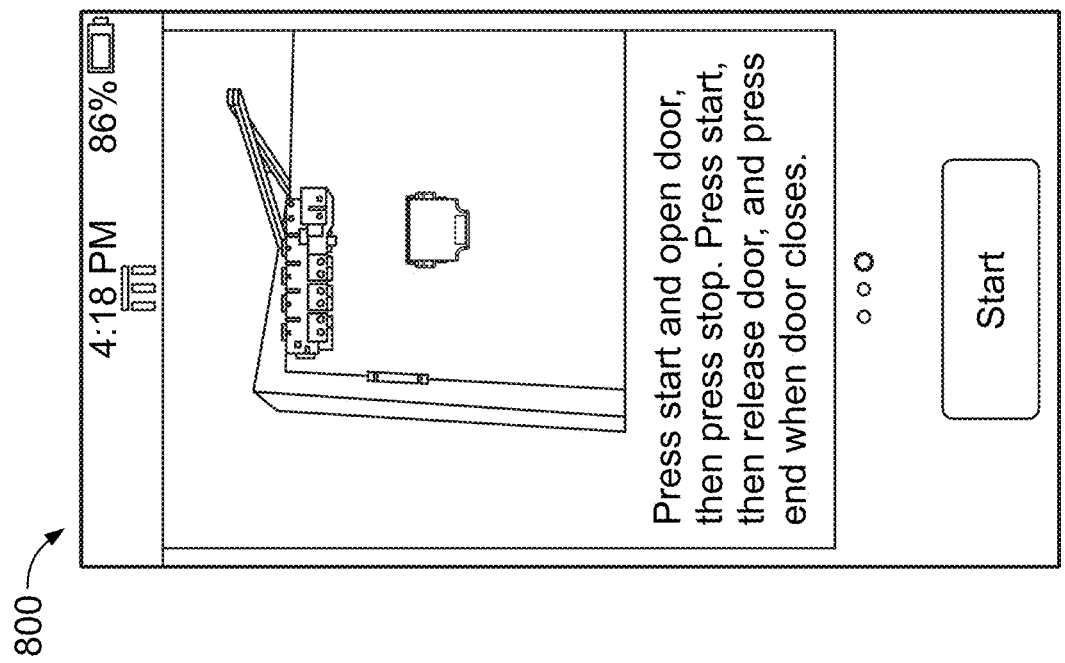
FIGS. 7-11 illustrate screen captures of at least one embodiment of a graphical user interface of a central processing device of FIG. 1A.

In block 310, the technician can provide user input to the application via the graphical user interface on the central processing device 102 to start motion tracking (e.g., generating/recording the motion data) and, in block 312, the technician releases the door 108 to allow the door 108 to move from the open position to the closed position under the force of the door closer 112. In block 314, the technician provides user input to the application via the graphical user interface on the central processing device 102 to stop motion tracking (e.g., when the door 108 comes to the closed position). Alternatively, the central processing device 102 can automatically decide to stop motion tracking, such as, for example, upon detection of one more of the following: a stoppage in the movement of the door 108 toward the closed position, the door 108 reaching the closed position, a speed or velocity of the door 108 reaching, or falling below, a certain level, expiration of a certain time duration, and/or a combination thereof, among other determinations and/or considerations. As shown in the exemplary screen capture 800 of the graphical user interface of the central processing device 102 in FIG. 8, in some embodiments, the application can instruct the technician to press the start button on the graphical user interface, release the door 108, and press an end button on the graphical user interface when the door 108 comes to the closed position.

In block 318, the technician can determine whether the door closer 112 has been successfully installed and adjusted based on feedback from the application via the graphical user interface of the central processing device 102. For example, as shown in the exemplary screen captures 900, 1000, 1100 of FIGS. 9-11 from the central processing device 102, if the door closer 112 has not been adjusted properly, the central processing device 102 can provide further installation instructions for the technician via the graphical user interface of the central processing device 102 with graphics, text, and/or videos identifying the particular adjustment(s) to make. For example, the central processing device 102 can instruct the technician to adjust a main valve of the door closer 112, as shown in the exemplary screen capture 900 of FIG. 9, adjust a spring of the door closer 112, as shown in the exemplary screen capture 1000 of FIG. 10, and/or adjust a latch valve of the door closer 112, as shown in the exemplary screen capture 1100 of FIG. 11.

In some embodiments, it should be appreciated that the central processing device 102 can, using at least information received from the data acquisition device 101 and/or information contain or derived by the central processing device 102 and/or server 106, further instruct the technician regarding the amount by which to adjust the relevant component, such as, for example, the amount to adjust the door closer 112. For example, in some embodiments, the central processing device 102 can instruct, or otherwise communicate to, the technician to adjust the main valve and/or latch valve by a half turn, a quarter turn, or an eighth turn, among other adjustments. Similarly, the central processing device 102 can instruct, or otherwise communicate to, the technician to adjust the spring, for example, by three turns. Further, in some embodiments, and with respect at least to information relating to the motion sensor 114, the amount of an adjustment to make can be based on a deviation (e.g., expressed as a ratio) of the duration in the various door movement zones from the target value(s). For example, the central processing device 102 can instruct, or otherwise communicate to, the technician to make a greater adjustment to the door closer 112 when there is a greater deviation, and may instruct the technician to make a lesser adjustment to the door closer 112 when there is a lesser deviation. Although the adjustments to the door closer 112 are described herein primarily in reference to a main valve, latch valve, and spring of the door closer 112, it should be appreciated that the door closer 112 may include additional and/or alternative adjustment mechanisms depending on the particular type of door closer 112.

If the feedback from the application indicates that an adjustment to the door closer 112 is required, in block 320, the technician may adjust the door closer 112 based on the application-provided instructions. Further, the method 300 returns to block 308 in which the technician again utilizes the data acquisition device 101 and the central processing device 102 to track the inputted mechanical force used to open the door 108, as well as the motion of the door 108 from the open position to the closed position for further analysis. It should be appreciated that the technician may be notified of the successful installation and adjustment of the door closer 112 via the application when no further adjustments are required, after which the installer can remove or detach the data acquisition device 101 from the door 108 at block 322.

Although the blocks 302-322 are described in a relatively serial manner, it should be appreciated that various blocks of the method 300 may be performed in parallel in some embodiments. Additionally, according to certain embodiments, following a determination of a successful installation/adjustment in block 318, and prior to detachment of the data acquisition device 101, the data acquisition device 101 can be further configured to provide the installer with instructions for certifying the door closer 112, such as, for example, certifying the door closer 112 per ANSI/BHMA A156.4. Moreover, the data acquisition device 101 can be configured to provide, or otherwise communicate from information received by the data acquisition device 101, steps to be taken by the technician to test and validate the performance of the door 108 and/or door closer 112 for at purposes of certification. According to such an embodiment, information obtained by the data acquisition device 101 during such testing, including for example, information obtained by the motion sensor 114 and/or load transducer 115, can be processed and evaluated by software of the data acquisition device 101, the central processing device 102, and/or the server 106 in accordance with determining whether the results of the performed test(s) satisfy corresponding certification standards. Additionally, the central processing device 102 and/or the server 106 can provide results of such certificating testing, which can be communicated to the technician via the display on a graphical user interface of the central processing device 102, as well as communicated to other devices that can be communicatively linked to the central processing device 102 and/or the server 106, including, for example, by email.

Figure 4:
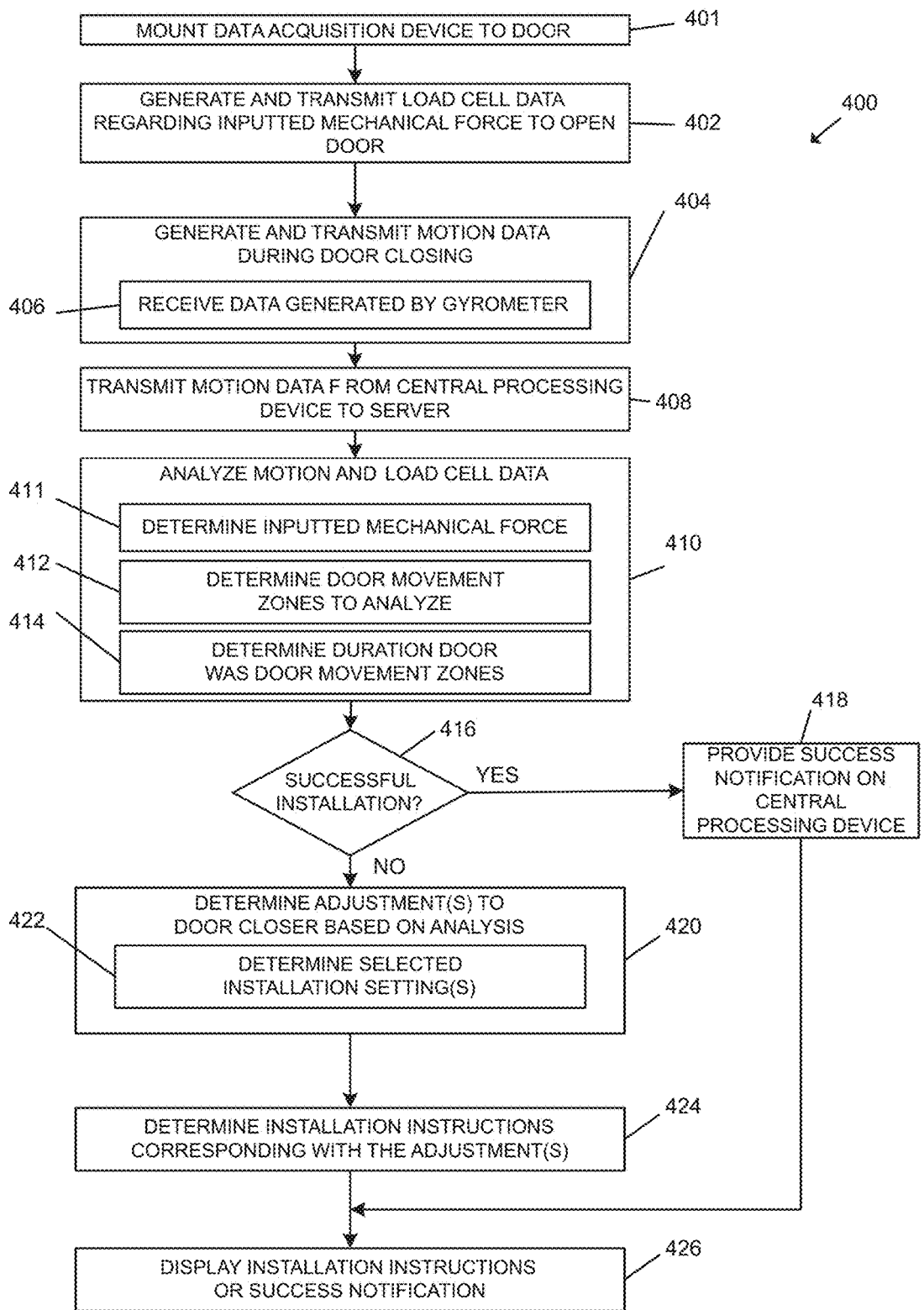
FIG. 4 is a simplified flow diagram of at least one embodiment of a method for adjusting a door closer using the door closer diagnostics system of FIG. 1A.

Referring now to FIG. 4, in use, the door closer diagnostics system 100 can execute a method 400 for adjusting the door closer 112. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 401, in which the data acquisition device 101 is mounted, or otherwise coupled or secured, to the door 108. At block 402, as the door 108 is opened, and the load cell or load transducer 115 can acquire data that is transmitted via a signal from the data acquisition device 101 to the central processing device 102 that can be used to determine the inputted mechanical force involved with opening the door 108. At block 404, the data acquisition device 101 generates/senses motion data with one or more sensors 114 of the data acquisition device 101 that can be transmitted to the central processing device 102. In particular, as described above, according to certain embodiments, the central processing device 102 can receive/retrieve angular velocity data generated by a motion sensor 114, such as, for example, a gyrometer, of the data acquisition device in block 406. As previously discussed, according to certain embodiments, the central processing device 102 can be configured, including, for example, have an application or app, that facilitates the central processing device 102 utilizing or analyzing the data received from the data acquisition device 101, and inputted mechanical force and/or motion data to determine whether the door closer 112 should be adjusted. Alternatively, or additionally, in block 408, the central processing device 102 can transmit the motion and/or inputted mechanical force data to the server 106 for analysis.

Figure 12:
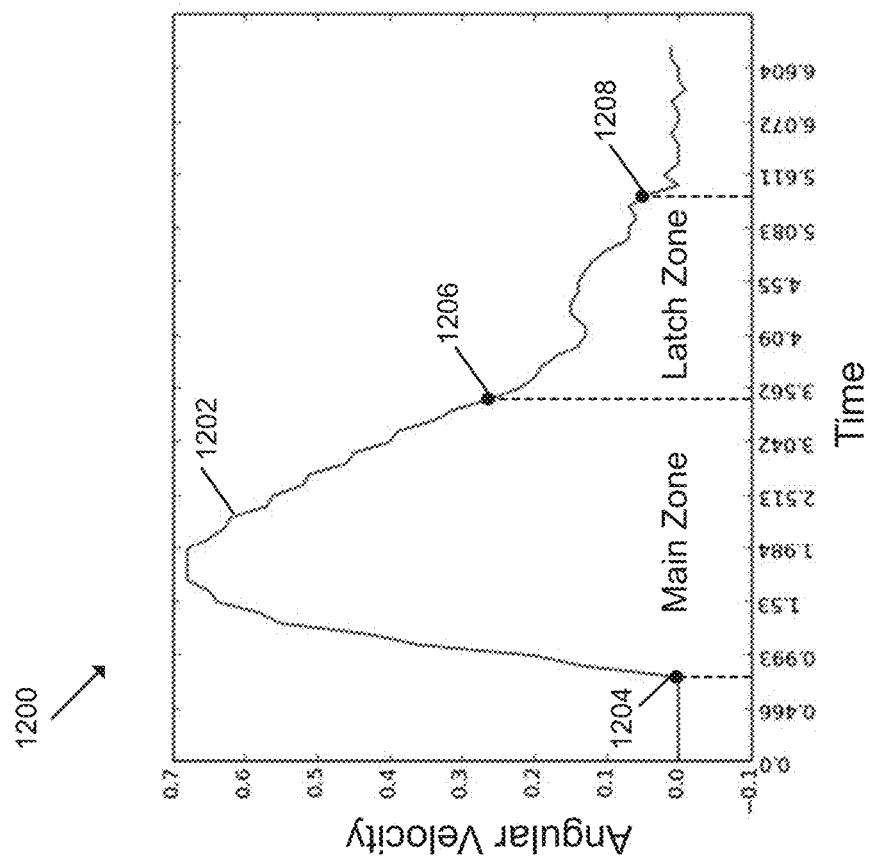
FIG. 12 is a graph illustrating at least one embodiment of motion data generated by a sensor of the door closer diagnostics system.

In block 410, the central processing device 102 and/or the server 106 analyzes the motion and inputted mechanical force data to determine whether the installation of the door closer 112 was successful (e.g., determining whether further adjustments are required). In particular, in block 411, the central processing device 102 and/or server 106 can determine, using information provided by the data acquisition device 101, and moreover from the load cell or load transducer 115, the central processing device 102 and/or the server 106, the inputted mechanical force associated with the door 108 being opened, as well as whether that determined inputted mechanical force is, or is not, in compliance with predetermined criteria, such as, for example, ADA regulations. In block 412, the central processing device 102 and/or the server 106 can also determine which door movement zones to analyze and, in block 414, the central processing device 102 and/or server 106 can determine the duration the door 108 was in each of the door movement zones. For example, in some embodiments, time-based angular velocity measurements of the door 108 can be recorded for the door 108 throughout the entire movement of the door 108 from the open position to the closed position (see, for example, graph 1200 of FIG. 12). The central processing device 102 and/or server 106 can segment that data based, for example, on the amplitude and/or direction of the movement. In particular, the central processing device 102 and/or server 106 can estimate the maximum angle or open position of the door 108 (e.g., by presuming the maximum angle or open position to be ninety degrees or by integrating the angular velocity data to approximate that angle) and segment the range of motion into a plurality of door movement zones. For example, in some embodiments, the range of motion may be segmented into a pre-closing zone, a main closing zone, a latch closing zone, and a post-closing zone. As such, the central processing device 102 and/or server 106 can determine the duration the door 108 was in each of the main zone and the latch zone. As shown in the graph 1200 of FIG. 12, in some embodiments, the central processing device 102 and/or server 106 may analyze the angular velocity data 1202 generated by the gyrometer 114 to determine a set of reference points 1204, 1206, 1208 that define the various door movement zones in the range of motion of the door 108 (e.g., by integrating the angular velocity data 1202).

In some embodiments, it should be appreciated that the sensor(s) 114, 115, among other sensors, and/or the data generated therefrom, can be normalized. More specifically, the relevant axes can be normalized such that they have the proper polarity and scale. For example, a right-handed door may see a positive velocity on the x-axis for a door opening, and a negative velocity on the y-axis, while a left-handed device (which involves "flipping" the system upside-down)

would have the positive and negative velocity indicators reversed. Further, it should be appreciated that a 12-bit gyrometer may provide different values than a 24-bit gyrometer, and therefore the values may be scaled/normalized into a standard unit to allow the application to account for variations in the hardware among central processing devices. Additionally, a device could be rotated in a suboptimal orientation such that part of the acceleration occurs on the x-axis, and part of the acceleration occurs on the y-axis; the data may be normalized to account for such variations in orientation.

In block 416, the central processing device 102 and/or server 106 determines whether the installation/adjustment was successful based on the analysis of the motion data. If successful, in block 418, a success notification can be displayed on the graphical user interface of the central processing device 102. According to certain embodiments, whether the installation/adjustment was successful can be determined by the server 106, block 418 can include the server 106 transmitting the success notification to the central processing device 104.

However, if further adjustment(s) is/are required, the central processing device 102 and/or server 106 can determine one or more adjustments to the door closer 112 based on an analysis of the motion and/or load cell data in block 420. In doing so, in block 420, the central processing device 102 and/or server 106 can determine one or more user-selected installation settings of the door closer 112 in block 422. For example, in some embodiments, the technician may input via the graphical user interface of the application on the central processing device 102 one or more regulatory requirements, building management or architect requirements, and/or other relevant requirements.

In some embodiments, the technician may select from a plurality of predefined installation settings options. For example, with respect to motion settings, a first option may have a 5 second close time with 2.5 seconds in the main zone and 2.5 seconds in the latch zone, a second option may have a 10 second close time with 5 seconds in the main zone and 5 seconds in the latch zone, and a third option may have a 9 second close time from 90 degrees to 15 degrees. Similarly, with respect to inputted mechanical force to open the door 108, the user may select a particular inputted mechanical force, or range of inputted mechanical forces, that the door closer 112 is to be able to accommodate and/or satisfy in connection with the force needed to open the door 108. As described above, in some embodiments, the adjustments to the door closer 112 made to satisfy relevant requirements can include loosening/tightening the main valve, latch valve, and/or spring of the door closer 112. It should be appreciated that, in some embodiments, blocks 416 and 420 can may be performed contemporaneously.

In block 424, one or more installation instructions corresponding with the required adjustment(s) to the door closer 112 can be determined. With respect to at least embodiments in which such instructions are determined, at least in part, by the server 106, block 424 can include the server 106 transmitting such determined instructions to the central processing device 102. In block 426, the central processing device 102 can display the installation instruction(s) or the success notification on the graphical user interface of the application for the technician. If an installation instruction is displayed, it should be appreciated that the technician is to perform the associated adjustment(s), and the method 400 may be re-executed after the completion of the adjustment(s) to determine whether any further adjustments are required.

Although the blocks 401-426 are described in a relatively serial manner, it should be appreciated that various blocks of the method 400 may be performed in parallel in some embodiments.

Figure 5:
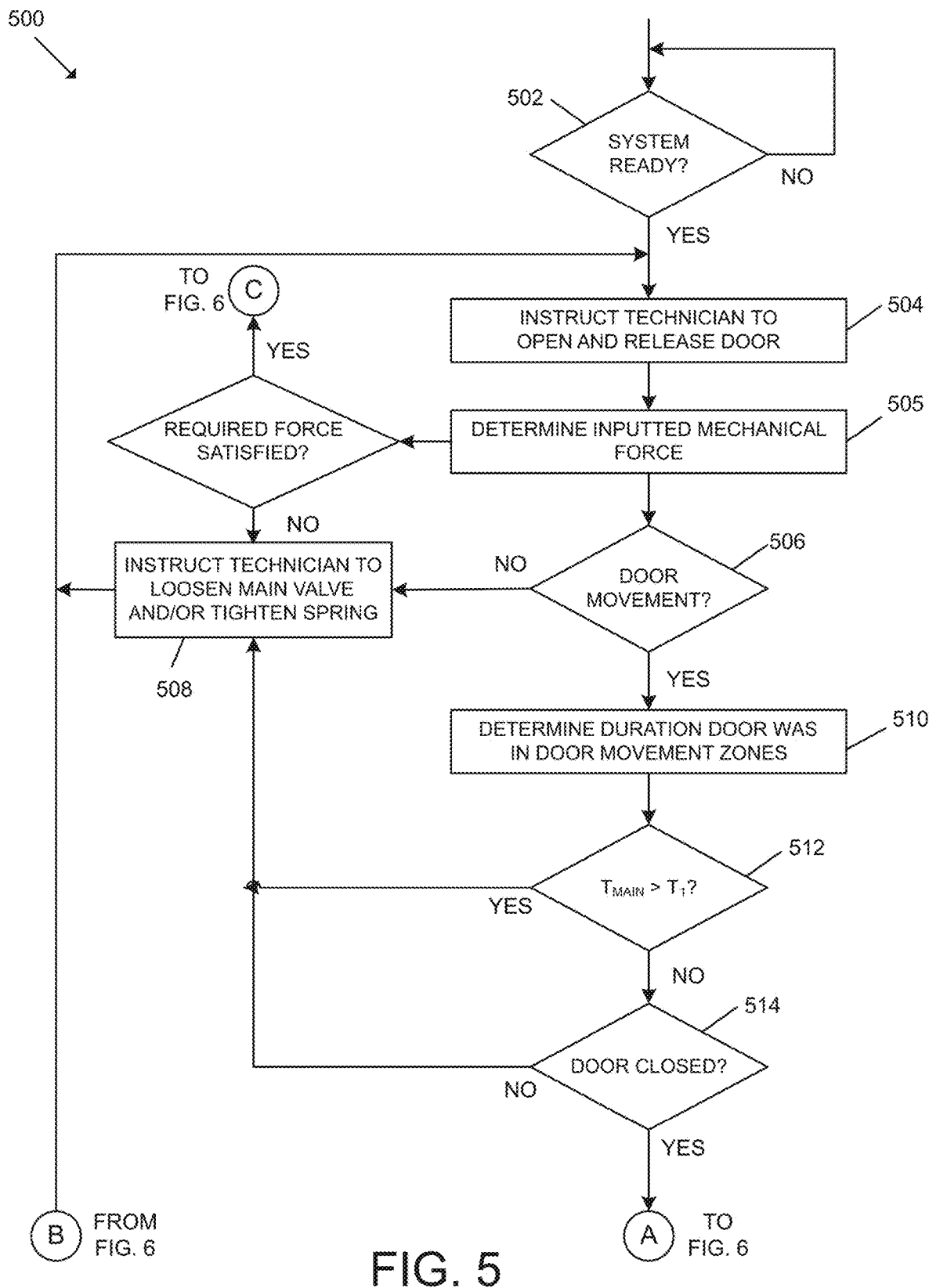
FIGS. 5-6 are a simplified flow diagram of at least one embodiment of a method for adjusting a door closer using the door closer diagnostics system of FIG. 1A.
Figure 6:
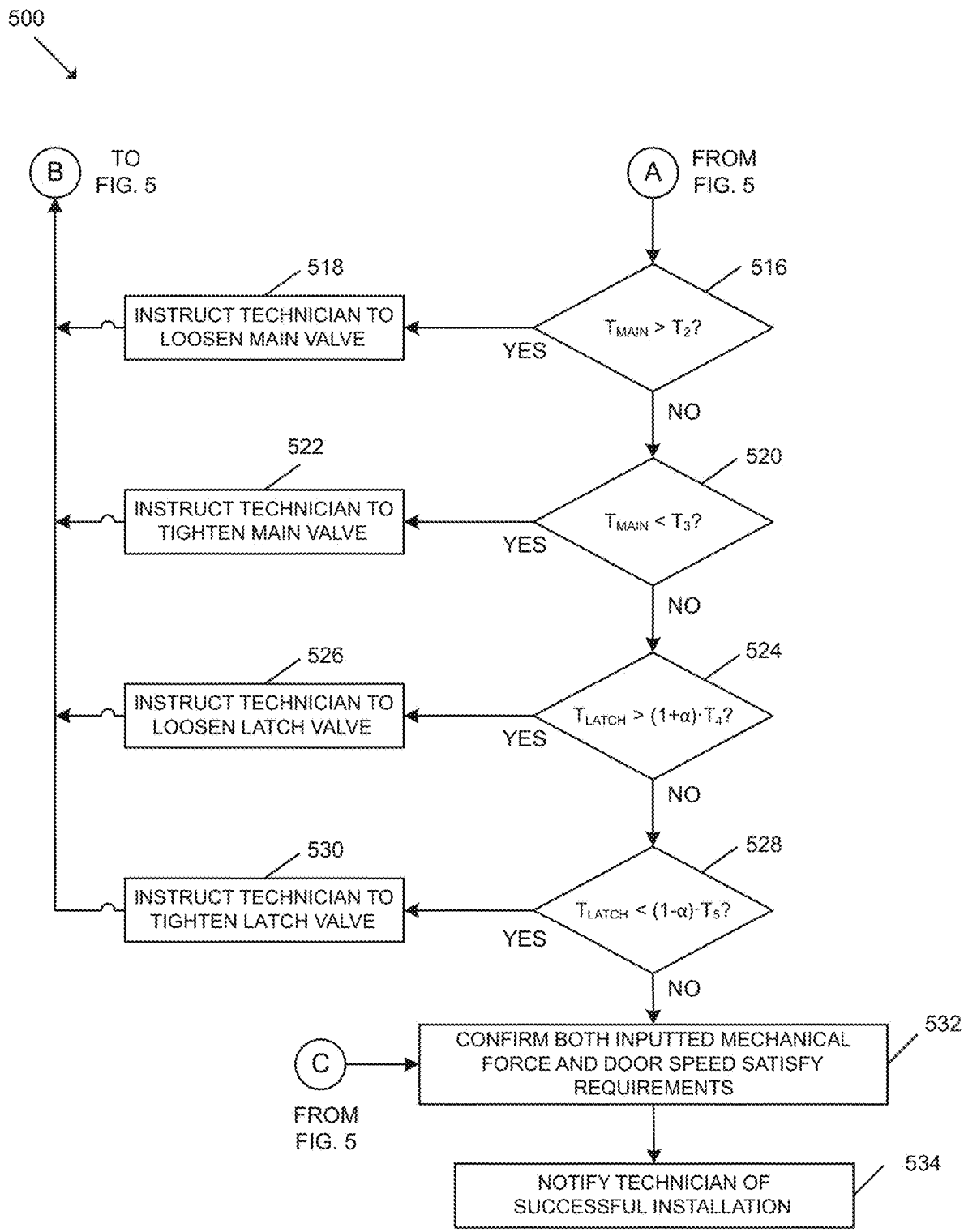

Referring now to FIGS. 5-6, in use, the door closer diagnostics system 100 may execute a method 500 for adjusting the door closer 112. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 of FIG. 5 in which it is determined whether the door closer diagnostics system 100 is ready to determine whether the door closer 112 is properly/successfully installed. In particular, in the illustrative embodiments, it is determined whether the door 108 is closed with the data acquisition device 101 properly mounted to the door 108, and whether the application is launched on the central processing device 102 for detecting forces associated with opening the door 108 and/or motion tracking of the door 108. If so, the method 500 advances to block 504 in which the central processing device 102 instructs the technician to open the door 108 (e.g., to approximately 90 degrees) and release the door 108 (see, for example, screen capture 800 of FIG. 8) while the data acquisition device 101 provides and/or records data regarding the inputted mechanical force used to open the door 108, as well as motion data relating to closing of the door 108. Such data can be transmitted from the data acquisition device 101 to the central processing device 102, and/or to the server 106, for analysis, as previously discussed.

In block 505, the door closer diagnostics system 100 (e.g., the central processing device 102 and/or server 106) determines the inputted mechanical force associated with the door 108 being opened, such as, for example, by the central processing device 102 and/or server 106 using data provided from the load cell or load transducer 115 of data acquisition device 101. At block 507, the central processing device 102 and/or server 106 can determine whether the inputted mechanical force determined at block 505 satisfies a predetermined criteria or threshold for the force needed to open the door 108. For example, at block 507, the central processing device 102 and/or server 106 can determine whether the inputted mechanical force determined at block 505 complies with a door opening force, or range of door opening forces, required for satisfaction of regulatory requirements, such as, for example, ADA regulations, among other relevant requirements. If at block 507 the inputted mechanical force determined at block 505 does satisfy such predetermined criteria or threshold requirements, then the method can proceed to block 532 (FIG. 6). Otherwise the method can proceed to block 508, at which adjustments for the door closer 112 that at least attempt to allow the door closer 112 to be in compliance with such predetermined criteria or threshold requirements can be determined (e.g. by the central processing device 102 and/or server 106) and communicated to the installer.

At block 506, the door closer diagnostics system 100 (e.g., the central processing device 102 and/or server 106) determines whether there was any door movement, for example, based on the motion data generated by the sensor(s) 114 of the data acquisition device 101. In other words, the door closer diagnostics system 100 can determine whether a hold open door condition has been detected. If there is no door movement, the method 500 advances to block 508.

Figure 10:
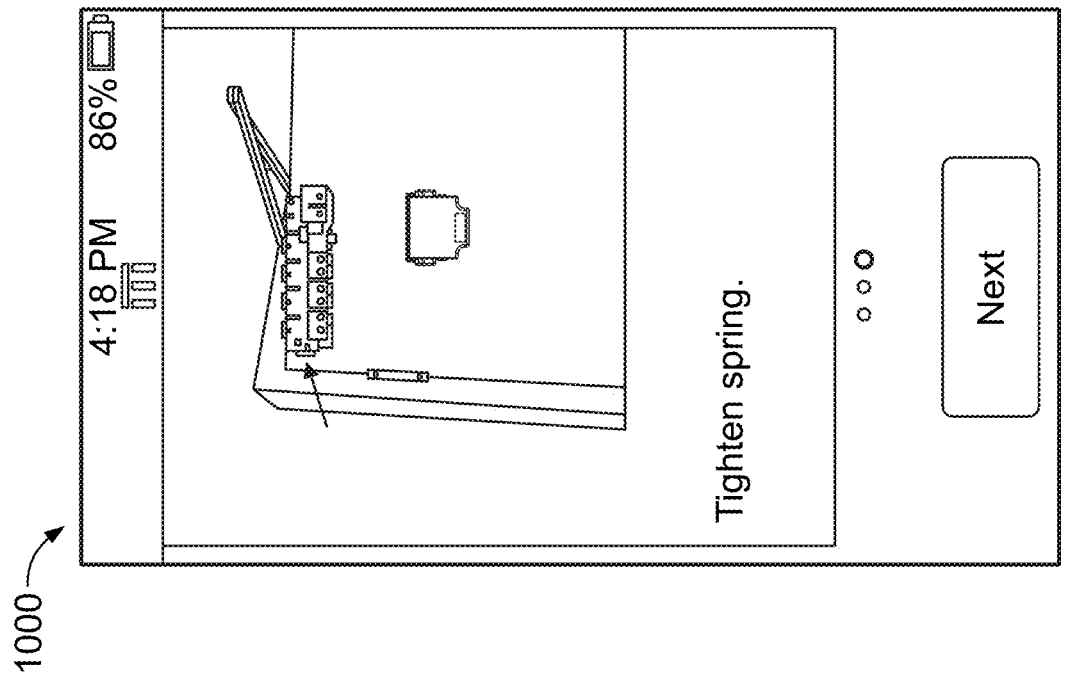
Figure 9:
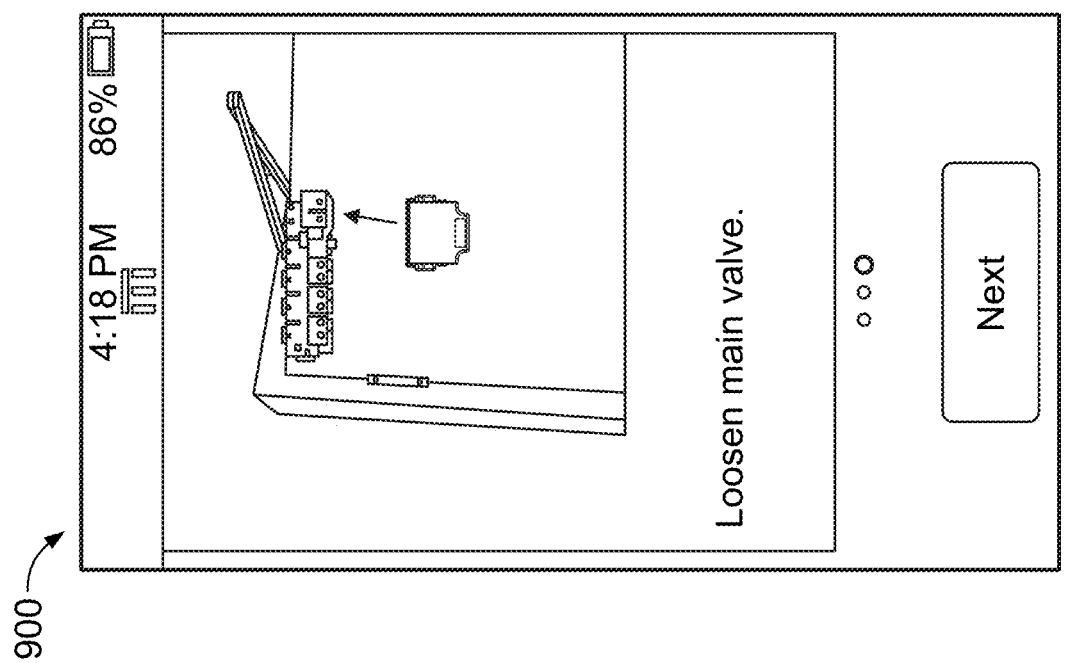
Figure 11:
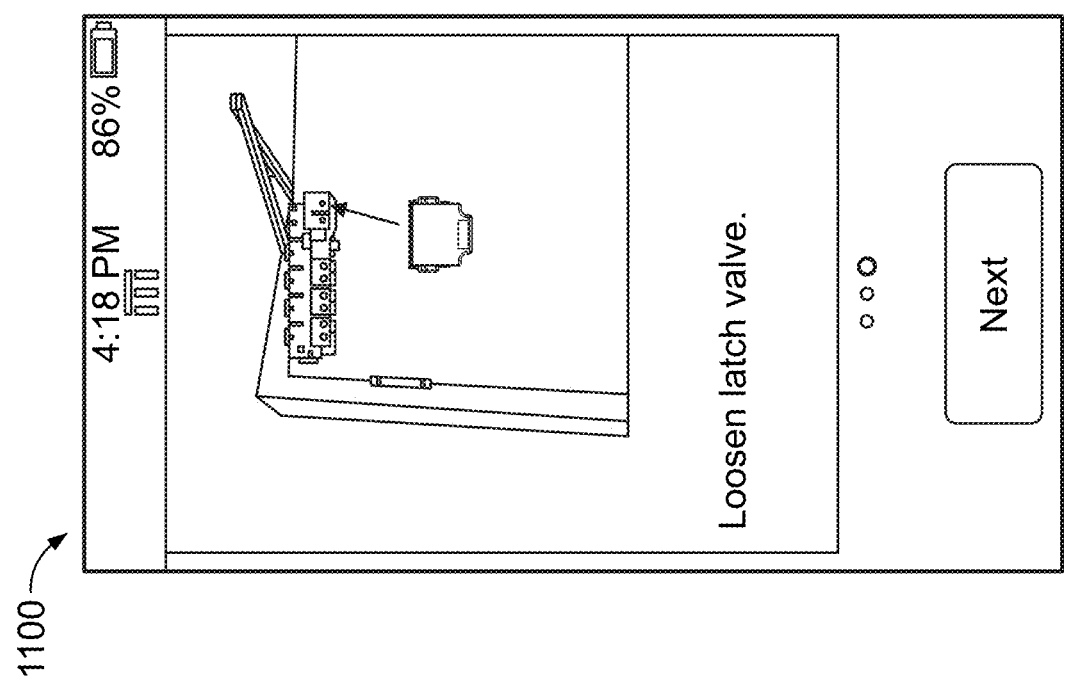

At block 508, the central processing device 102 can instruct the technician to loosen the main valve and/or tighten the spring of the door closer 112. In particular, in some embodiments, the central processing device 102 may first instruct the technician to loosen the main valve (see, for example, screen capture 900 of FIG. 9) and, if the technician has already loosened the main valve, the central processing device 102 may instruct the technician to tighten the spring (see, for example, screen capture 1000 of FIG. 10). As shown in FIGS. 9-10, the installation instructions presented on the graphical user interface of the central processing device 102 may identify the location of the particular component to be adjusted (e.g., via an arrow or other suitable indicator). After making the adjustment, the method 500 can return to block 504 in which the central processing device 102 again instructs the technician to open and release the door 108 as the data acquisition device 101 provides data or information to the central processing device 102 regarding the inputted mechanical force and/or the motion of the door 108.

If it is determined at block 508 that the door 108 moved, the method 500 advances to block 510 in which the door closer diagnostics system 100 determines the duration the door 108 was in each of the door movement zones. For example, in the illustrative embodiment, the door closer diagnostics system 100 can determine the duration the door 108 was in the main zone ($T_{MAIN}$) and the duration the door 108 was in the latch zone ($T_{LATCH}$) as described above. In block 512, the door closer diagnostics system 100 can determine whether the duration the door 108 was in the main zone ($T_{MAIN}$) is greater than a corresponding threshold time ($T_1$). That is, the door closer diagnostics system 100 determines whether $T_{MAIN} > T_1$. In some embodiments, the threshold time ($T_1$) is 7 seconds. If so, the method 500 advances to block 508 in which the central processing device 102 instructs the technician to loosen the main valve and/or tighten the spring of the door closer 112 as described above.

If the door 108 was not in the main zone for a duration greater than the corresponding threshold time ($T_1$), the method 500 advances to block 514 in which the door closer diagnostics system 100 determines whether the door 108 moved to the closed position. If not, the method 500 advances to block 508 in which the central processing device 102 instructs the technician to loosen the main valve and/or tighten the spring of the door closer 112 as described above. However, if the door 108 closed, the method 500 advances to block 516 of FIG. 6 in which the door closer diagnostics system 100 determines whether the duration the door 108 was in the main zone ($T_{MAIN}$) is greater than another corresponding threshold time ($T_2$), where $T_2 < T_1$. That is, the door closer diagnostics system 100 determines whether $T_{MAIN} > T_2$. In some embodiments, the threshold time ($T_2$) is 3.5 seconds. If so, the method 500 advances to block 518 in which the central processing device 102 instructs the technician to loosen the main valve of the door closer 112.

If the door 108 was not in the main zone for a duration greater than the corresponding threshold time ($T_2$), the method 500 advances to block 520 in which the door closer diagnostics system 100 determines whether the duration the door 108 was in the main zone ($T_{MAIN}$) is less than another corresponding threshold time ($T_3$), where $T_3 < T_2$. That is, the door closer diagnostics system 100 determines whether $T_{MAIN} < T_3$. In some embodiments, the threshold time ($T_3$) is 2.5 seconds. If so, the method 500 advances to block 522 in which the central processing device 102 instructs the technician to tighten the main valve of the door closer 112.

If the door 108 was not in the main zone for a duration less than the corresponding threshold time ($T_3$), the method 500 advances to block 524 in which the door closer diagnostics system 100 determines whether the duration the door 108 was in the latch zone ($T_{LATCH}$) is greater than another corresponding threshold time ($T_4$). If so, the method 500 advances to block 526 in which the central processing device 102 instructs the technician to loosen the latch valve of the door closer 112. It should be appreciated that the threshold time ($T_4$) may be based on the duration the door 108 was in the main zone ($T_{MAIN}$). In particular, in the illustrative embodiment, the threshold time ($T_4$) is proportional to the duration the door 108 was in the main zone ($T_{MAIN}$) such that $T_4=(1=\alpha) \cdot T_{MAIN}$, where $\alpha>0$. For example, in an embodiment in which $\alpha=0.20$, the door closer diagnostics system 100 determines whether the duration the door 108 was in the latch zone ($T_{LATCH}$) is at least 20% greater than the duration the door was in the main zone ($T_{MIN}$).

If the door 108 was not in the latch zone ($T_{LATCH}$) for a duration greater than the corresponding threshold time ($T_4$), the method 500 advances to block 528 in which the door closer diagnostics system 100 determines whether the duration the door 108 was in the latch zone ($T_{LATCH}$) is less than another corresponding threshold time ($T_5$). If so, the method 500 advances to block 530 in which the central processing device 102 instructs the technician to tighten the latch valve of the door closer 112. It should be appreciated that the threshold time ($T_5$) may be based on the duration the door 108 was in the main zone ($T_{MAIN}$). In particular, in the illustrative embodiment, the threshold time ($T_5$) is proportional to the duration the door 108 was in the main zone ($T_{MAIN}$) such that $T_5=(1-\alpha) \cdot T_{MAIN}$ where $\alpha>0$. For example, in an embodiment in which $\alpha=0.20$, the door closer diagnostics system 100 determines whether the duration the door 108 was in the latch zone ($T_{LATCH}$) is at least 20% less than the duration the door was in the main zone ($T_{MAIN}$). After making the adjustment in any of blocks 518, 522, 526, 530, the method 500 returns to block 504 in which the central processing device 102 again instructs the technician to open and release the door 108 as the data acquisition device 101 provides data or information that the central processing device 102 and/or server 106 uses to determine motion information regarding the movement of the door 108.

If the door 108 was not in the latch zone ($T_{LATCH}$) for a duration less than the corresponding threshold time ($T_5$), then, according to certain methods, the method 500 can advance to block 532, where the method can confirm both the inputted mechanical force and door speed have been determined to comply with predetermined criteria or requirements, before proceeding to block 534, at which the central processing device 102 notifies the technician of a successful installation (i.e., that no further adjustments are necessary). In other words, in the illustrative embodiment, and with respect to the door motion or speed analysis, no adjustments are necessary if the duration the door 108 was in the main zone ($T_{MAIN}$) is within the relevant main zone thresholds (i.e., $T_3 \leq T_{MAIN} \leq T_2$) and the duration the door 108 was in the latch zone ($T_{LATCH}$) is within the relevant latch zone thresholds (i.e., $(1 \cdot \alpha) \cdot T_{MAIN} \leq T_{LATCH} \leq (1+\alpha) \cdot T_{MAIN}$). It should be appreciated that the particular values of the thresholds may vary depending on the particular type of door closer 112, any relevant installation requirements/settings, and/or based on the particular embodiment.

While certain examples have been provided for the threshold times $T_1$-$T_5$, it is to be appreciated that other values may be utilized for the threshold times. In certain embodiments, one or more of the threshold times may correspond to selections made by the user. For example, in embodiments in which the user selects a close time of 10 seconds, the first threshold time $T_1$ may be 7 seconds, the second threshold time $T_2$ may be 3.5 seconds, and the third threshold time $T_3$ may be 2.5 seconds. As noted above, the fourth threshold time $T_4$ and the fifth threshold time $T_5$ may be based upon the actual time that the door 108 spends in the main swing zone $T_{MAIN}$. In other embodiments, the fourth threshold time $T_4$ and the fifth threshold time $T_5$ may be preselected values that do not necessarily correspond to the main swing time $T_{MAIN}$.

Although the blocks 502-534 are described in a relatively serial manner, it should be appreciated that various blocks of the method 500 may be performed in parallel in some embodiments.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   removably coupling a data acquisition device to a door having a door closer, the data acquisition device comprising a housing, and at least one motion sensor and at least one load cell or load transducer mounted within the housing;
   generating, by the at least one motion sensor, motion data indicative of motion of the door as the door is moved between an open position and a closed position;
   generating, by the at least one load cell or load transducer, mechanical force data associated with movement of the door;
   transmitting the motion data and the mechanical force data from the data acquisition device to a central processing device having a graphical user interface separate from the data acquisition device;
   analyzing the motion data to determine a duration the door was in each of a plurality of door movement zones between the open position and the closed position;
   analyzing the mechanical force data to determine if a force used to open the door satisfies a predetermined criteria, and determining, if the force used to open the door does not satisfy the predetermined criteria, at least one force adjustment to the door closer to adjust the force needed to open the door;
   determining at least one adjustment to the door closer for a successful installation of the door closer based on the duration the door was in each of the plurality of door movement zones;
   displaying at least one installation instruction corresponding with the at least one adjustment on the graphical user interface of the central processing device; and
   removing the data acquisition device from the door.

2. The method of claim 1, further including:
   displaying, if the force used to open the door does not satisfy the predetermined criteria, at least one force adjustment installation instruction corresponding with the at least one force adjustment on the graphical user interface of the central processing device.

3. The method of claim 1, wherein analyzing the motion data comprises (i) transmitting the motion data from the central processing device to a server and (ii) analyzing the motion data by the server to determine the duration the door was in each of the plurality of door movement zones; and
   wherein determining the at least one adjustment to the door closer comprises determining the at least one adjustment by the server.

4. The method of claim 1, further comprising displaying, on the graphical user interface of the central processing device, a notification indicative of a successful installation of the door closer in response to a determination that no adjustments to the door closer are necessary for a successful installation of the door closer.

5. The method of claim 1, wherein determining the at least one adjustment comprises determining an adjustment to a main valve of the door closer.

6. The method of claim 1, wherein determining the at least one adjustment comprises determining an adjustment to a latch valve of the door closer.

7. The method of claim 1, wherein determining the at least one adjustment comprises determining an adjustment to a spring of the door closer.

8. The method of claim 1, wherein the plurality of door movement zones comprises a main zone and a latch zone;
   wherein determining the at least one adjustment to the door closer comprises determining to loosen a main valve of the door closer in response to determining the duration the door was in the main zone is greater than a first threshold time; and
   wherein determining the at least one adjustment to the door closer comprises determining to tighten the main valve in response to determining the duration the door was in the main zone is less than a second threshold time, wherein the first threshold time is greater than the second threshold time.

9. The method of claim 8, wherein determining the at least one adjustment to the door closer comprises determining to loosen a latch valve of the door closer in response to determining the duration the door was in the latch zone is greater than a third threshold time; and
   wherein determining the at least one adjustment to the door closer comprises determining to tighten the latch valve in response to determining the duration the door was in the latch zone is less than a fourth threshold time, and wherein each of the third threshold time and the fourth threshold time is based on the duration the door was in the main zone.

10. The method of claim 9, wherein each of the third threshold time and the fourth threshold time is proportional to the duration the door was in the main zone.

11. The method of claim 8, wherein determining the at least one adjustment to the door closer comprises determining to at least one of loosen the main valve or tighten a spring of the door closer in response to determining the door does not move from the open position to the closed position in less than a fifth threshold time, and wherein the fifth threshold time is greater than the first threshold time.

12. The method of claim 1, wherein determining the at least one adjustment to the door closer comprises determining the at least one adjustment to the door closer based on at least one user-selected installation setting for the door closer.

13. The method of claim 1, wherein the central processing device is located remote from the data acquisition device.

14. The method of claim 1, wherein the data acquisition device is mounted for movement with the door, and wherein the central processing device is not mounted for movement with the door.

15. The method of claim 1, wherein the load cell or load transducer includes a retractable measuring device that is configured to measure force at particular distances from a hinge of the door for various door sizes; and
   wherein the analyzing the mechanical force data comprises using the retractable measuring device to measure the force used to open the door for a particular size of the door.

16. The method of claim 1, wherein the housing is removably coupled to the door by an adhesive.

17. The method of claim 1, wherein the analyzing the mechanical force data to determine if a force used to open the door satisfies a predetermined criteria comprises analyzing the mechanical force data in each of the plurality of door movement zones.

18. A door closer diagnostics system, comprising:
   a door closer secured to a door;
   a central processing device; and
   a data acquisition device comprising a housing, and at least one motion sensor and at least one load cell mounted within the housing, and wherein the data acquisition device is configured to (i) be removably mounted to the door, (ii) generate, by the at least one motion sensor, motion data indicative of motion of the door as the door is moved between an open position and a closed position, (iii) generate, by the at least one load cell, load data indicative of a force used to open the door from the closed position, (iv) transmit the motion data and the load data to the central processing device, and (v) be removed from the door;
   wherein the central processing device is configured to analyze the motion data to (i) determine a duration the door was in each of a plurality of door movement zones between the open position and the closed position, (ii) determine at least one adjustment to the door closer based on the duration the door was in each of the plurality of door movement zones, and (iii) provide at least a first installation instruction corresponding with the at least one adjustment;
   wherein the central processing device if further configured to analyze the load data to (i) determine the force used to open the door from the closed position, (ii) determine if the force used to open the door satisfies a predetermined criteria, (iii) determine, if the force used to open the door did not satisfy the predetermined criteria, at least one force adjustment to the door closer for adjusting the force required to open the door, and (iv) provide at least a second installation instruction corresponding with the at least one force adjustment; and
   wherein the central processing device is further configured to display the first installation instruction and the second installation instruction on a graphical user interface of the central processing device.

19. The door closer diagnostics system of claim 18, wherein the at least one motion sensor comprises a gyrometer, and wherein the at least one load cell comprises a load cell or a load transducer.

20. The door closer diagnostics system of claim 18, wherein the data acquisition device includes a mount structured to removably mount the data acquisition device to at least one of the door or the door closer.

21. The door closer diagnostics system of claim 18, wherein the data acquisition device includes a mount configured to directly attach the data acquisition device to the door.

22. The door closer diagnostics system of claim 18, wherein the door closer comprises a main valve, a latch valve, and a spring adjustment screw; and
   wherein the at least one adjustment comprises an adjustment to at least one of the main valve, the latch valve, or the spring adjustment screw.

23. A method, comprising:
   removably mounting a data acquisition device to a door having a door closer, the data acquisition device comprising a housing, and at least one motion sensor and at least one load cell mounted within the housing;
   launching an application on a central processing device to record (1) motion data indicative of motion of the door generated by the at least one motion sensor of the data acquisition device, and (2) load data indicative of a inputted mechanical force applied to open the door generated by the at least one load cell of the data acquisition device;
   opening the door to an open position;
   releasing the door from the open position;
   adjusting the door closer based on at least one installation instruction provided by the application in response to an analysis of at least one of (1) the motion data generated as the door moved from the open position to a closed position, and (2) the load data generated as the door was being opened; and
   removing the data acquisition device from the door.

24. The method of claim 23, wherein adjusting the door closer comprises adjusting at least one of a main valve of the door closer, a latch valve of the door closer, or a spring of the door closer.

* * * * *